United States Patent
Theertham et al.

(10) Patent No.: US 11,021,984 B2
(45) Date of Patent: Jun. 1, 2021

(54) GAS TURBINE ENGINE FAN PLATFORM

(71) Applicant: United Technologies Corporation, Farmington, CT (US)

(72) Inventors: Arun K. Theertham, Rocky Hill, CT (US); Peter Karkos, Ivoryton, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 92 days.

(21) Appl. No.: 15/915,803

(22) Filed: Mar. 8, 2018

(65) Prior Publication Data
US 2019/0277150 A1    Sep. 12, 2019

(51) Int. Cl.
*F01D 11/00* (2006.01)
*F01D 5/28* (2006.01)

(52) U.S. Cl.
CPC ............ *F01D 11/008* (2013.01); *F01D 5/282* (2013.01); *F05D 2220/323* (2013.01); *F05D 2220/36* (2013.01); *F05D 2240/80* (2013.01); *F05D 2300/603* (2013.01)

(58) Field of Classification Search
CPC .................................................... F01D 11/008
See application file for complete search history.

(56) References Cited

U.S. PATENT DOCUMENTS

| | | | | |
|---|---|---|---|---|
| 4,655,687 A * | 4/1987 | Atkinson | ............. | F01D 11/008 416/190 |
| 5,222,865 A * | 6/1993 | Corsmeier | ............ | F01D 5/3007 416/193 A |
| 6,217,283 B1 * | 4/2001 | Ravenhall | ............... | F01D 5/225 416/2 |
| 6,514,045 B1 * | 2/2003 | Barton | ...................... | F01D 5/22 416/193 A |
| 9,039,379 B2 | 5/2015 | Radomski | | |
| 9,145,784 B2 * | 9/2015 | Evans | ................... | F01D 5/3092 |
| 9,759,226 B2 | 9/2017 | Duelm et al. | | |
| 9,845,699 B2 * | 12/2017 | Feeney | ................. | F01D 11/008 |
| 2003/0012654 A1 * | 1/2003 | Strassberger | ......... | F01D 5/3007 416/219 R |
| 2010/0290910 A1 * | 11/2010 | Hoyland | ............... | F01D 11/008 416/193 R |
| 2011/0033292 A1 * | 2/2011 | Huth | ..................... | F01D 21/045 416/1 |
| 2011/0038731 A1 * | 2/2011 | Evans | ...................... | F01D 5/06 416/220 R |
| 2011/0243709 A1 * | 10/2011 | El-Aini | ..................... | F01D 5/26 415/1 |
| 2016/0076388 A1 | 3/2016 | Robertson | | |

FOREIGN PATENT DOCUMENTS

| | | |
|---|---|---|
| EP | 2154334 A2 | 2/2010 |
| EP | 2253802 A2 | 11/2010 |
| EP | 2287446 A2 | 2/2011 |
| EP | 2372094 A2 | 10/2011 |

OTHER PUBLICATIONS

European Search Report Application No. EP 19 16 1741.

* cited by examiner

*Primary Examiner* — Woody A Lee, Jr.
(74) *Attorney, Agent, or Firm* — Cantor Colburn LLP

(57) ABSTRACT

A platform assembly for a fan of a gas turbine engine includes a lug, and a platform. The lug has a head, a base, and a leg that extends between the head and the base. The platform is at least partially disposed about the head. The platform has an outer surface and an inner surface. The head is arranged to engage the inner surface.

18 Claims, 4 Drawing Sheets

GAS TURBINE ENGINE FAN PLATFORM

BACKGROUND

Turbofan engines generally include a plurality of fan blades that extend from a hub and fan platforms that are coupled to the hub. As the fan rotates, the platform sections may experience loading that may reduce the efficiency of the fan.

Accordingly, it is desirable to provide a more robust platform section.

BRIEF DESCRIPTION

Disclosed is a platform assembly for a fan of a gas turbine engine includes a lug, and a platform. The lug has a head, a base, and a leg that extends between the head and the base. The platform is at least partially disposed about the head. The platform has an outer surface and an inner surface. The head is arranged to engage the inner surface.

In addition to one or more of the features described above, or as an alternative to any of the foregoing embodiments, the platform is molded about the head of the lug.

In addition to one or more of the features described above, or as an alternative to any of the foregoing embodiments, the outer surface and inner surface extend between a first platform edge and a second platform edge.

In addition to one or more of the features described above, or as an alternative to any of the foregoing embodiments, the first platform edge engages a first side of the leg and the second platform edge engages a second side of the leg that is disposed opposite the first side of the leg.

In addition to one or more of the features described above, or as an alternative to any of the foregoing embodiments, the inner surface of the platform defines a cavity.

In addition to one or more of the features described above, or as an alternative to any of the foregoing embodiments, the head is disposed within the cavity.

In addition to one or more of the features described above, or as an alternative to any of the foregoing embodiments, wherein a fill is disposed within the cavity.

In addition to one or more of the features described above, or as an alternative to any of the foregoing embodiments, the lug is made of a first material and the platform is made of a second material different from the first material.

Also disclosed is a platform assembly for a fan of a gas turbine engine includes a first lug and a platform. The first lug has a first head, a first base, and a first leg that extends between the first head and the first base. The platform has an outer surface, an inner surface spaced apart from the outer surface, and a cavity defined by the inner surface. The first head is at least partially disposed within the cavity and engages the inner surface.

In addition to one or more of the features described above, or as an alternative to any of the foregoing embodiments, the first head includes a first head surface that is spaced apart from the inner surface and a second head surface that engages the inner surface.

In addition to one or more of the features described above, or as an alternative to any of the foregoing embodiments, the first head extends about the inner surface of the platform.

In addition to one or more of the features described above, or as an alternative to any of the foregoing embodiments, the first head defines a head cavity.

In addition to one or more of the features described above, or as an alternative to any of the foregoing embodiments, a second lug is provided. The second lug is spaced apart from the first lug. The second lug has a second head, a second base, a third base, a second leg that extends between the second head and the second base, and a third leg that extends between the second head and the third base.

In addition to one or more of the features described above, or as an alternative to any of the foregoing embodiments, the second head is disposed within the cavity and engages the inner surface.

In addition to one or more of the features described above, or as an alternative to any of the foregoing embodiments, the second leg engages the third leg.

Further disclosed is a gas turbine engine that includes a fan section, a compressor section and a platform assembly. The fan section has a hub disposed about a central longitudinal axis. The compressor section is disposed downstream of the fan section. The platform assembly is operatively connected to the hub and extends towards the compressor. The platform assembly includes a first lug and a platform. The first lug has a first head, a first base at least partially received by the hub, and a first leg that extends between the first head and the first base. The platform has an outer surface, an inner surface spaced apart from the outer surface, and a cavity defined by the inner surface. The first head is at least partially disposed within the cavity and engages the inner surface.

In addition to one or more of the features described above, or as an alternative to any of the foregoing embodiments, the first lug has a second leg, spaced apart from the first leg, and extending between the first head and the first base.

In addition to one or more of the features described above, or as an alternative to any of the foregoing embodiments, the platform is molded about the first head.

In addition to one or more of the features described above, or as an alternative to any of the foregoing embodiments, the first lug is made of a metallic material and the platform is made of a composite material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
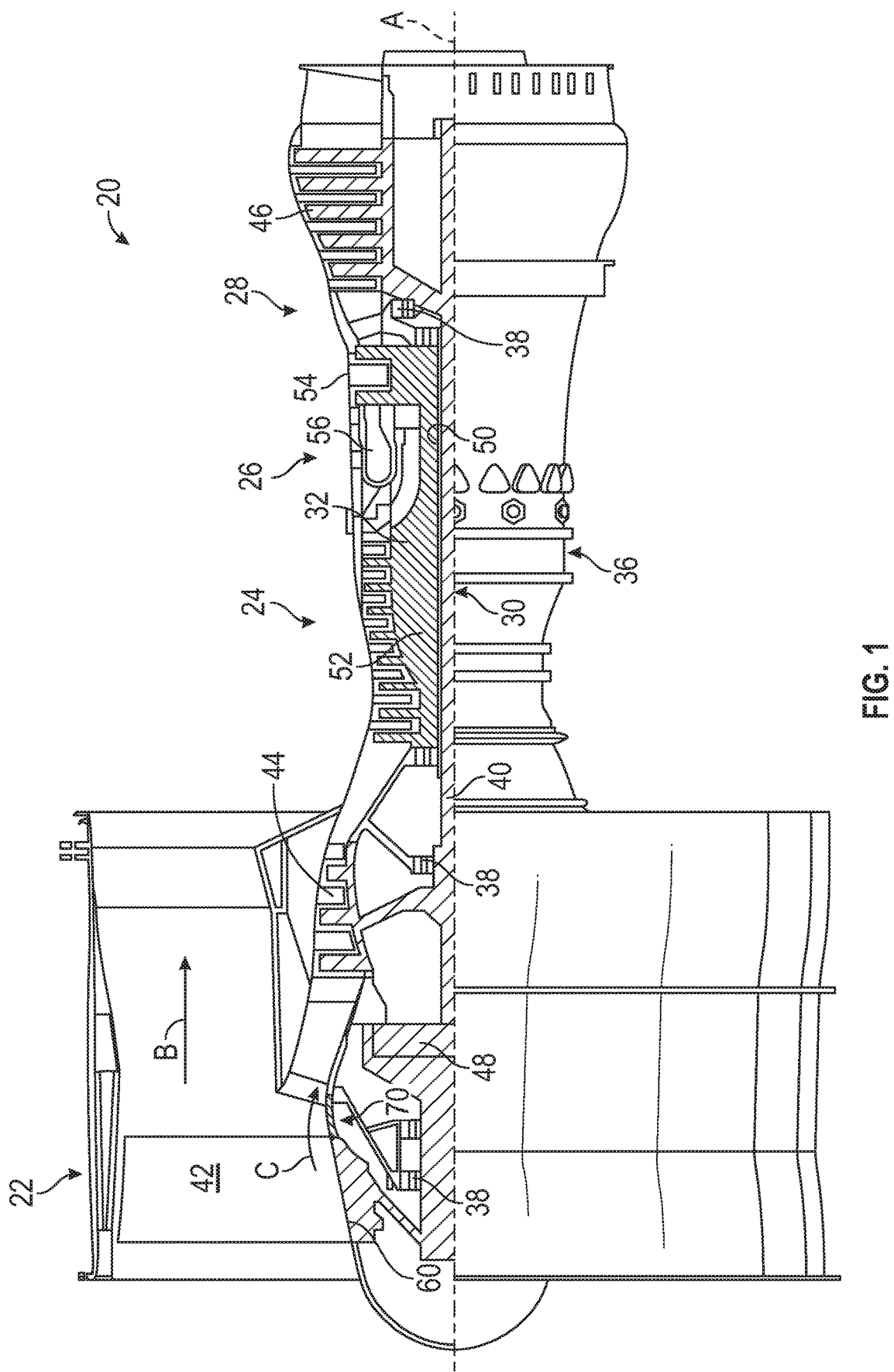
FIG. 1 is a schematic illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about (2.3:1). It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Fan blades of the fan 42 of the fan section 22 extend from a hub 60 that is disposed and is arranged to rotate about the central longitudinal axis A. The hub 60 is coupled to the inner shaft 40.

A platform assembly 70 is operatively connected to the hub 60 and extends towards the compressor section 24. The platform assembly 70 is arranged to direct air along the core flow path C into the compressor section 24.

Figure 2:
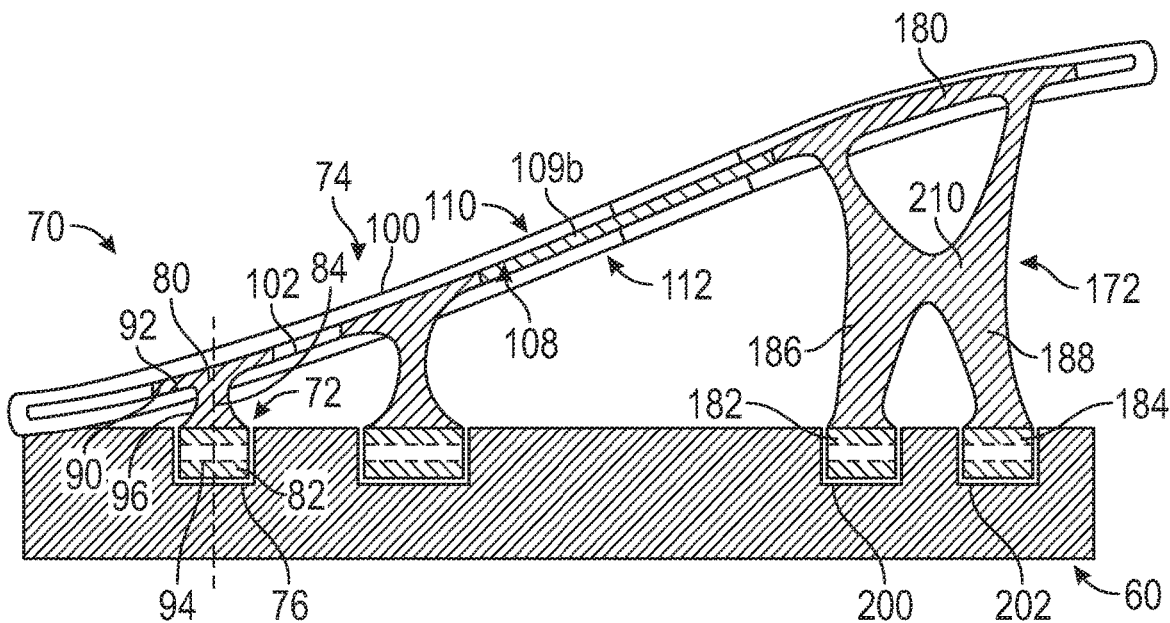
FIG. 2 is a cross-sectional view of a portion of a platform assembly.
Figure 3:
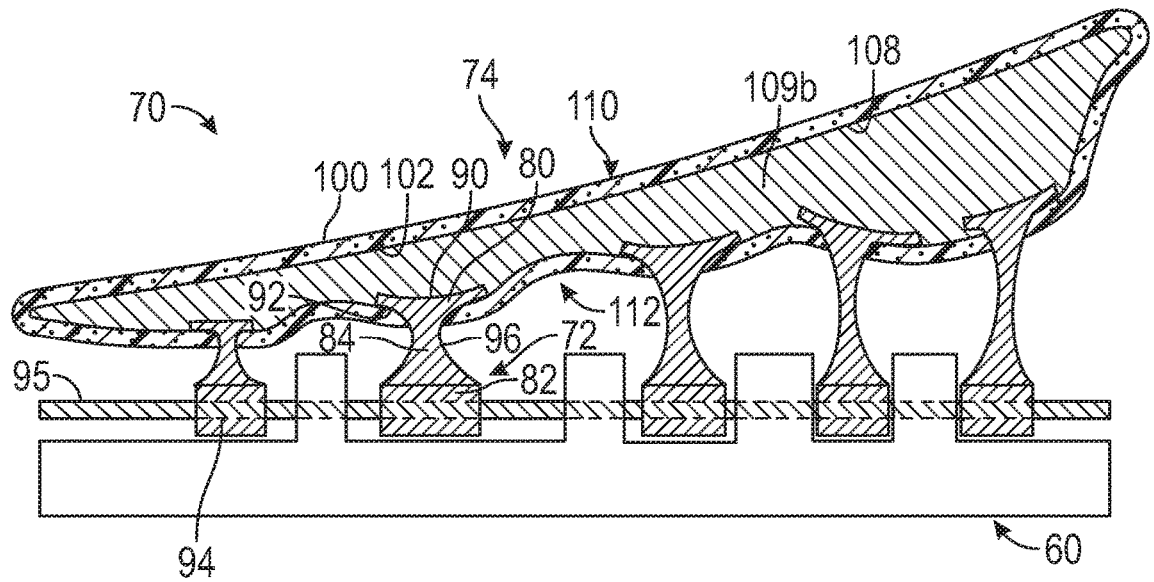
FIG. 3 is a cross-sectional view of a portion of a platform assembly.

Referring to FIGS. 2 and 3, the platform assembly 70 includes a lug 72 that is connected to the hub 60 and a laminated flow path structure, such as a platform 74 that is joined or molded to the lug 72. The lug 72 extends into a pocket 76 that is defined by the hub 60 to secure the platform assembly 70 to the hub 60. In at least one embodiment, a plurality of lugs may be provided. The number of lugs and the shape of the lugs may be varied to meet fit and function. For example, as shown in FIG. 3, the number of lugs associated with each platform 74 may range between approximately 2 to 5 lugs. The lugs may be configured as the lug 72 or the second lug 172.

The lug 72 may be made of a first material such as a metallic material. The platform 74 may be made of a second material that is different from the first material, such as a composite.

The lug 72 includes a head 80, a base 82, and a leg 84 extending between the head 80 and the base 82. The head 80 includes a first head surface 90 and a second head surface 92 that is disposed opposite the first head surface 90. The base 82 is received within the pocket 76 of the hub 60. The base 82 may define a central opening 94 that extends along an axis that is disposed generally parallel to the central longitudinal axis A. The central opening 94 is arranged to receive a pin 95 (shown in FIG. 3) that extends through side walls of the pocket 76 to operatively couple the base 82 to the hub 60. The leg 84 extends from the second head surface 92 towards the base 82. The leg 84 may have a neck or a tapered region 96 that is spaced apart from ends of the leg 84.

The platform 74 is at least partially disposed about the head 80. The platform 74 may be made of a composite material that is molded about the head 80. The platform 74 and the lug 72 may be cured together, such that the platform assembly 70 defines a co-cured composite flowpath. The platform 74 includes an outer surface 100, an inner surface 102 that is disposed opposite the outer surface 100, a first platform edge 104, and a second platform edge 106. The outer surface 100 and the inner surface 102 each extend between the first platform edge 104 and the second platform edge 106.

The inner surface 102 defines a cavity 108 such that the platform 74 may be a hollow composite shell or tubular composite structure. The cavity 108 is arranged to receive the head 80 of the lug 72.

Figure 4:
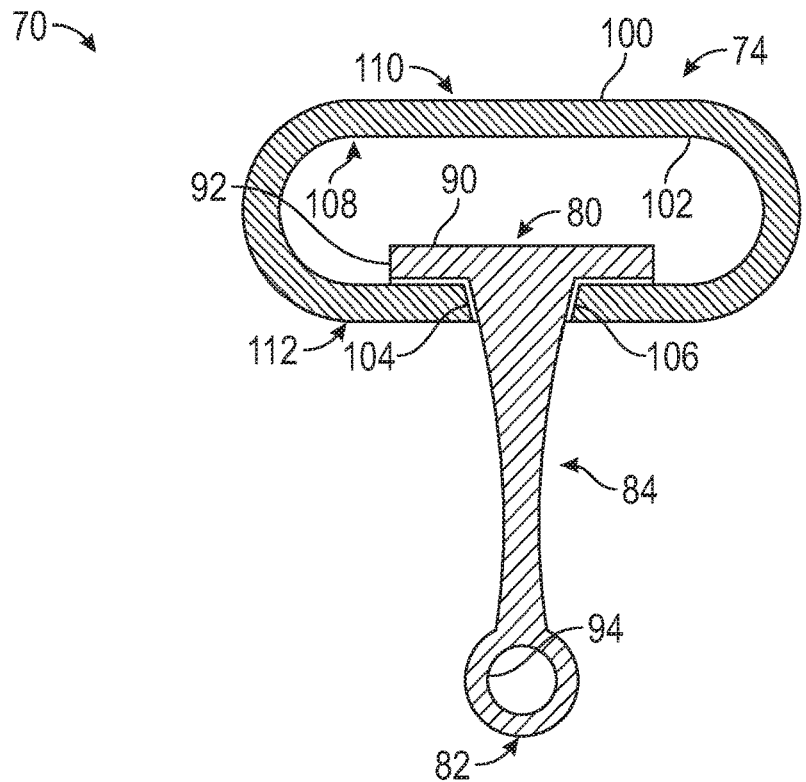
FIG. 4 is a front, cross-sectional view of a portion of a platform assembly.
Figure 5:
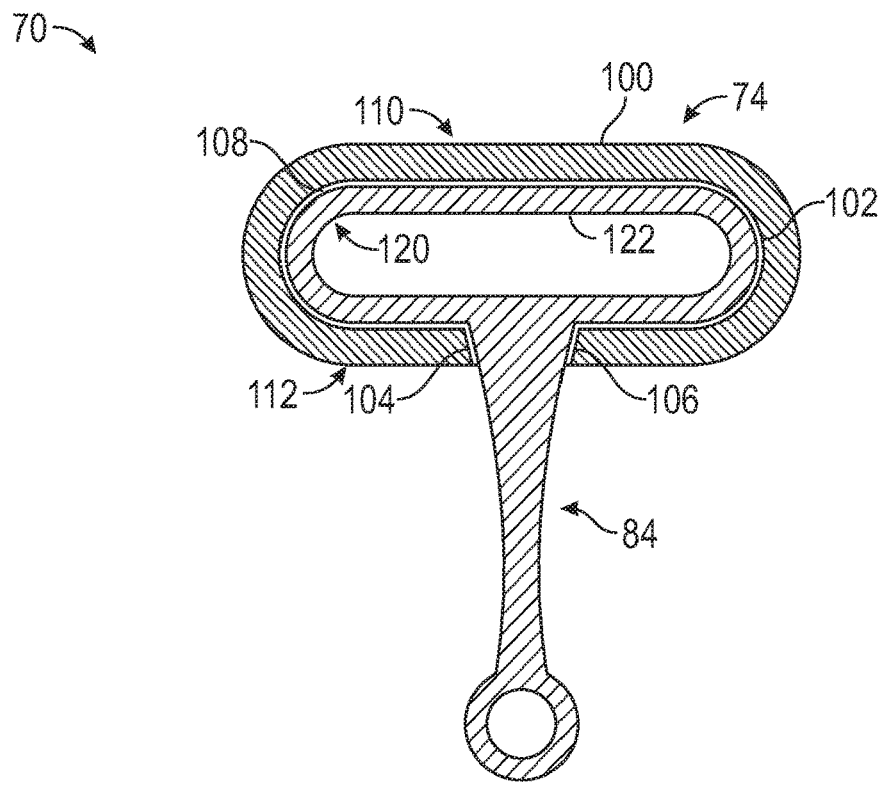
FIG. 5 is a front, cross-sectional view of a portion of a platform assembly.
Figure 6:
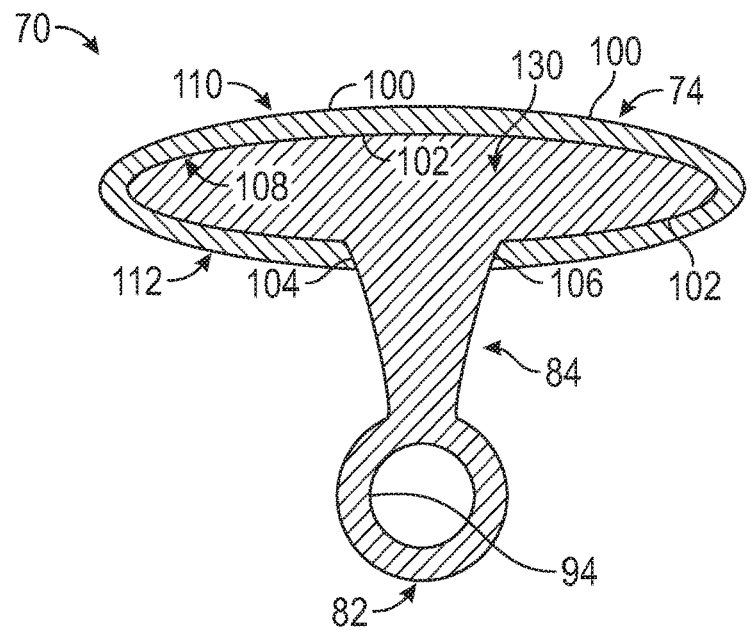
FIG. 6 is a front, cross-sectional view of a portion of a platform assembly.

The first platform edge 104 engages a first side of the leg 84 and the second platform edge 106 engages a second side of the leg 84 that is disposed opposite the first side of the leg 84, as shown in FIGS. 4-6. This enables the platform 74 to at least partially wrap around the head 80 of the lug 72.

In this configuration, the separation or decoupling of the lugs 72 from the laminated flow path of the platform 74 allows the lugs 72 and the platform 74 to work together more efficiently such that the platform 74 and the lugs 72 are loaded in tension with some shear effect along the interface between the lugs and the platform 74. This loading enables the platform assembly 70 to react and distribute platform operational loads. The configuration of the platform assembly 70 reduces interlaminar effects around the interface between the platform 74 and the lugs 72.

In the embodiments shown in FIGS. 2 and 3, a fill 109b may be disposed within the cavity 108 that may be a hollow cavity. The fill 109b may be a structural fill or the like. As shown in FIG. 3, the fill 109b may be at least partially disposed about the head 80 of the lugs 72.

The platform 74 may have an outer portion 110 and an inner portion 112. The outer portion 110 defines a flow path or flow surface of the platform assembly 70 that directs airflow towards the compressor section 24. The outer portion 110 may have a ramped shape.

The inner portion 112 is disposed opposite the outer portion 110 and is disposed closer to the hub 60 than the outer portion 110. The inner portion 112 defines an opening through which the leg 84 extends. Referring to FIG. 2, the inner portion 112 may have a ramped shape complementary to the outer portion 110. Referring to FIG. 3, the inner portion 112 may have a ramped shape defining a plurality of undulations or may have a generally undulating shape.

Referring to FIG. 2, the first head surface 90 may engage a first portion of the inner surface 102 of the outer portion 110 and the second head surface 92 may engage a second portion of the inner surface 102 of the inner portion 112 that is disposed opposite the first portion. The second head surface 92 may be secured to the inner surface 102 by an adhesive, fastener, or other method.

The head 80 of the lug 72 may be shaped such that it follows the shape or contour of at least one of the outer portion 110 or the inner portion 112. As shown in FIG. 2, the head 80 may have a ramped shape that matches or is complementary to the outer portion 110 and the inner portion 112. As shown in FIG. 3, the head 80 may have an arcuate or undulate shape that matches or is complementary to the inner portion 112.

Referring to FIG. 5, a cross-sectional front view of the platform assembly 70, the head 80 may be an enlarged hollow head 120 that is disposed within the cavity 108 and extends about the inner surface 102 of the platform 74. The enlarged hollow head 120 includes an inner surface 122 that defines a head cavity. The enlarged hollow head 120 may be secured to the inner surface 102 by an adhesive, fastener, or other method.

Referring to FIG. 6, a cross-sectional front view of the platform assembly 70, the head 80 may be an enlarged solid head 130 that is disposed within the cavity 108 and fills the cavity 108. The enlarged solid head 130 may be secured to the inner surface 102 by an adhesive, fastener, or other method.

Referring to FIGS. 3 and 4, the first head surface 90 may be spaced apart from the inner surface 102 and the second head surface 92 may engage the inner surface 102 proximate the inner portion 112. The second head surface 92 may be secured to the inner surface 102 by an adhesive, fastener, or other method.

Referring to the right side of FIG. 2, the platform assembly 70 may include a second lug 172. The second lug 172 is spaced apart from the lug 72. The second lug 172 includes a second head 180, a second base 182, a third base 184, a second leg 186, and a third leg 188.

The second head 180 is disposed within the cavity 108. The second head 180 may have a generally similar configuration as the head 80. The second head 180 may engage a first portion of the inner surface 102 of the outer portion 110 and may engage a second portion of the inner surface 102 of the inner portion 112 that is disposed opposite the first portion, as shown in FIG. 2. The second head 180 may be spaced apart from a first portion of the inner surface 102 of the outer portion 110 and may engage a second portion of the inner surface 102 of the inner portion 112, as shown in FIG. 3.

The second base 182 is received within a second pocket 200 of the hub 60. The third base 184 is spaced apart from the second base 182 and is received within a third pocket 202 of the hub 60. The second base 182 and the third base 184 may have a generally similar configuration as the base 82.

The second leg 186 extends between the second head 180 and the second base 182. The third leg 188 extends between the second head 180 and the third base 184. The second leg 186 may engage the third leg 188. In at least one embodiment, the second leg 186 may be joined to the third leg 188 proximate a joining region 210 that is disposed between the second head 180, the second base 182, and the third base 184.

Figure 7:
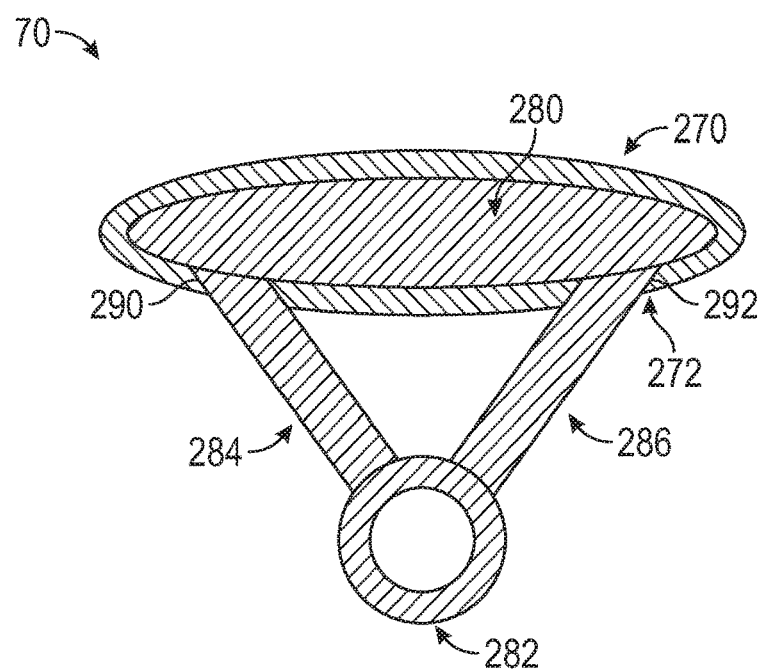
FIG. 7 is a front, cross-sectional view of a portion of a platform assembly.

Referring to FIG. 7, a cross-sectional front view of a platform assembly 270 is shown. The platform assembly 270 includes the platform 74 and a lug 272. The lug 272 includes a head 280, a base 282, a first leg 284, and a second leg 286.

The head 280 is at least partially disposed within the cavity 108 defined by the inner surface 102 of the platform 74. The head 280 may be an enlarged solid head that is disposed within the cavity 108 and fills the cavity 108. The head 280 engages the inner surface 102. The base 282 is at least partially received by a pocket of the hub 60.

The first leg 284 extends between the head 280 and the base 282. The first leg 284 extends through a first opening 290 that is defined by the inner portion 112 of the platform 74. The second leg 286 extends between the head 280 and the base 282. The second leg 286 extends through a second opening 292 that is defined by the inner portion 112 of the platform 74.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A platform assembly for a fan of a gas turbine engine, comprising:
   a lug having a head, a base, and a leg extending between the head and the base; and
   a hollow platform at least partially disposed about the head, the hollow platform having an outer surface and an inner surface, the inner surface of the hollow platform defining a substantially enclosed cavity and wherein the head is located in the substantially enclosed cavity and is arranged to engage a portion of the inner surface of the cavity while being spaced from another portion of the inner surface of the cavity.

2. The platform assembly of claim 1, wherein the hollow platform is molded about the head of the lug.

3. The platform assembly of claim 1, wherein the outer surface and inner surface extend between a first platform edge and a second platform edge.

4. The platform assembly of claim 3, wherein the first platform edge engages a first side of the leg and the second platform edge engages a second side of the leg that is disposed opposite the first side of the leg.

5. The platform assembly of claim 1, wherein the lug is made of a first material and the hollow platform is made of a second material different from the first material.

6. The platform assembly of claim 1, wherein the hollow platform is a tubular platform.

7. A platform assembly for a fan of a gas turbine engine, comprising:
   a lug having a head, a base, and a leg extending between the head and the base; and
   a platform at least partially disposed about the head, the platform having an outer surface and an inner surface, the inner surface of the platform defining a cavity and the head being arranged to engage the inner surface, wherein a fill is disposed within the cavity.

8. A platform assembly for a fan of a gas turbine engine, comprising:
   a first lug having a first head, a first base, and a first leg extending between the first head and the first base;
   a platform having an outer surface, an inner surface spaced apart from the outer surface, and a cavity defined by the inner surface, the first head being disposed within the cavity and engages the inner surface; and
   a second lug, spaced apart from the first lug, the second lug having a second head, a second base, a third base, a second leg extending between the second head and the second base, and a third leg extending between the second head and the third base.

9. The platform assembly claim 8, wherein the first head includes a first head surface that is spaced apart from the inner surface and a second head surface that engages the inner surface.

10. The platform assembly of claim 8, wherein the first head extends about the inner surface of the platform.

11. The platform assembly of claim 10, wherein the first head defines a head cavity.

12. The platform assembly of claim 8, wherein the second head is disposed within the cavity and engages the inner surface.

13. The platform assembly of claim 8, wherein the second leg engages the third leg.

14. A gas turbine engine, comprising:
    a fan section having a hub disposed about a central longitudinal axis;
    a compressor section disposed downstream of the fan section; and
    a platform assembly operatively connected to the hub and extending towards the compressor, the platform assembly comprising:
    a first lug having a first head, a first base at least partially received by the hub, and a first leg extending between the first head and the first base, and
    a hollow platform having an outer surface, an inner surface spaced apart from the outer surface, and a substantially enclosed cavity defined by the inner surface, the first head being disposed within the substantially enclosed cavity, wherein the head is arranged to engage a portion of the inner surface of the substantially enclosed cavity while being spaced from another portion of the inner surface of the substantially enclosed cavity.

15. The gas turbine engine of claim 14, wherein the first lug has a second leg, spaced apart from the first leg, and extending between the first head and the first base.

16. The gas turbine engine of claim 14, wherein the hollow platform is molded about the first head.

17. The gas turbine engine of claim 14, wherein the first lug is made of a metallic material and the hollow platform is made of a composite material.

18. The gas turbine engine as in claim 14, wherein the hollow platform is a tubular platform.

* * * * *